United States Patent [19]

Trümper

[11] 4,367,900
[45] Jan. 11, 1983

[54] MINERAL MINING INSTALLATION WITH ELECTRONIC CONTROL

[75] Inventor: Thomas Trümper, Werne, Fed. Rep. of Germany

[73] Assignee: Gewerkschaft Eisenhutte Westfalia, Lunen, Fed. Rep. of Germany

[21] Appl. No.: 226,358

[22] Filed: Jan. 19, 1981

[30] Foreign Application Priority Data

Feb. 2, 1980 [DE] Fed. Rep. of Germany ....... 3003910

[51] Int. Cl.³ .............................................. E21C 29/00
[52] U.S. Cl. ........................................... 299/1; 173/7; 299/30
[58] Field of Search ............................ 299/1; 173/5, 7

[56] References Cited

U.S. PATENT DOCUMENTS 1,566,460 12/1925 Wyman ............................. 299/30 X
3,633,081 1/1972 Weber et al. ....................... 299/1 X
3,988,578 10/1976 Weber ................................. 173/7 X

*Primary Examiner*—Ernest R. Purser
*Attorney, Agent, or Firm*—Thompson, Birch, Gauthier & Samuels

[57] ABSTRACT

A shearer-type mineral winning machine has three-phase a.c. motors on its main body for driving cutting drums and for propelling the machine along a mineral face. The frequency of the a.c. power supplied to the motor which serves to move the machine is varied and controlled in dependence on the operation of the cutting drums. Electronic control means for monitoring the performance of the cutting drums and for controlling the frequency of the a.c. power supplied to the machine drive motor are located in a control station in a protected position in a gallery remote from the machine and power is supplied to the machine via cables and/or bus bars.

11 Claims, 2 Drawing Figures

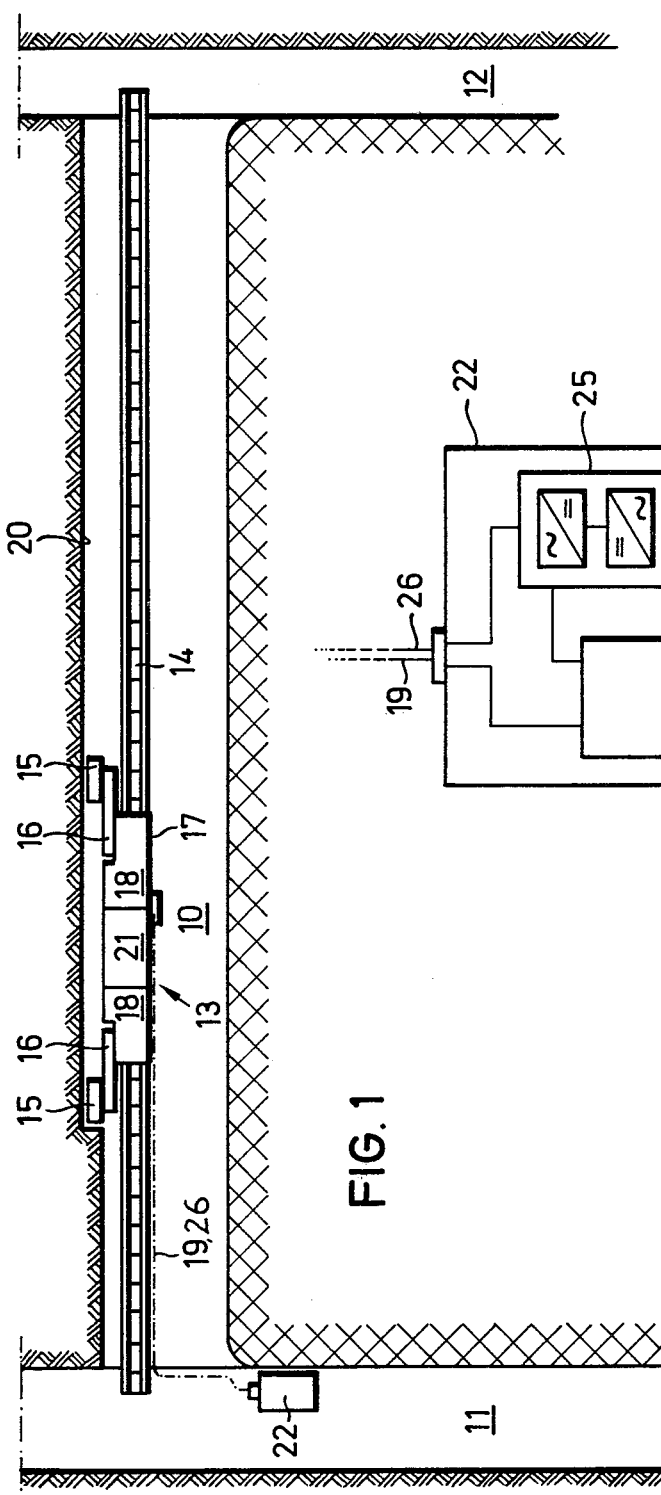
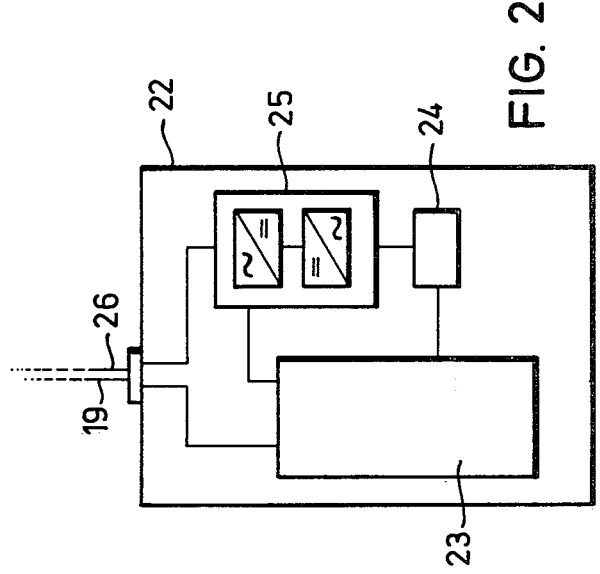
FIG. 1
FIG. 2

MINERAL MINING INSTALLATION WITH ELECTRONIC CONTROL

BACKGROUND TO THE INVENTION

The present invention relates in general to mineral mining installations and more particularly to installations employing a mineral winning machine equipped with rotary cutting means, such as cutter drums.

It is known to win mineral, especially coal, with the aid of a shearer which has cutter drums supported on pivotable arms. The cutter drums are usually driven by drive means, such as one or more three-phase a.c. motors, mounted on the main body or structure of the shearer or winning machine. The machine is also provided with further drive means which effects the actual movement of the machine in relation to the mineral face. This further drive means can take a variety of different forms. For example, a chain drive system with a winch or the like can be adopted or a chainless propulsive system can serve to move the overall machine. Hydraulic or electric power can serve to propell the machine and in the latter case a d.c. motor is quite conventional.

A general object of the present invention is to provide an improved form of mineral mining installation of the aforementioned kind.

An installation constructed in accordance with the invention utilizes a winning machine of the shearer type, i.e. with rotary cutting means, and a dynamic control system which optimize the performance of the machine. The control system continuously controls the propulsive speed of the machine in dependence on the performance, e.g. power consumption, of the cutting means i.e. the cutter drum or drums. Hence, depending on the prevailing conditions, and particularly the hardness of the mineral face, the machine is driven at an appropriate speed. One convenient system for achieving this objective has a frequency converter which provides variable-frequency a.c. power to a motor which determines the propulsive speed of the machine. The various monitoring and control devices which make up this control system are mounted remote from the machine and conveniently in a control station located in a gallery or roadway outside the main working. The devices making up the control system are thus well protected. A cable and/or bushbar can link the machine to the control station.

Power can be supplied to the machine via the cable and the performance monitoring information can also pass along this cable. The drive means which propels the machine or determines the propulsive speed of the machine preferably takes the form of a three-phase a.c. asynchronous motor which is fed by the frequency converter. Monitoring means in the control station can sense the power consumption of the cutter drum or drums and control the frequency converter accordingly. The cutter drum or drums can also be driven by one or more three-phase a.c. motors. The power for all the motors can be conveyed via a composite cable.

A mineral mining installation constructed in accordance with the invention may comprise a winning machine with a main body equipped with at least one rotary cutting means, first drive means carried on the body for driving the cutting means, second drive means carried on the body for moving the machine and an electronic control system remote from the machine for controlling the second drive means in dependence on the operation of the cutting means.

A self-propelled shearer driven by a three-phase a.c. motor built on to its body structure and having a further a.c. motor driving at least one cutter drum thereof can be improved by the provision of a control station separate from the machine in a gallery or roadway outside the main working in which the shearer operates, a composite cable electrically connecting the motors to the control station, monitoring means in the control station for remotely sensing a function of the motor driving the cutter drum signifying the performance of the latter and control means in the control station for controlling the operational speed of the motor driving the machine in accordance with the performance as sensed by the monitoring means.

The invention may be understood more readily, and various other features of the invention may become apparent, from consideration of the following description.

BRIEF DESCRIPTION OF DRAWINGS

An embodiment of the invention will now be described, by way of example only, with reference to the accompanying drawing, wherein:

FIG. 1 is a diagrammatic plan view of an insitu underground mineral mining installation constructed in accordance with the invention; and FIG. 2 is a block schematic representation of the control station of the installation.

DESCRIPTION OF PREFERRED EMBODIMENT

As shown in FIG. 1, a longwall mineral face working 10 adjoins a main gate roadway 11 and a subsidiary access gallery 12 in known manner. Within the main working 10 there is arranged a mineral winning machine 13 which takes the form of a shearer with two rotatable cutting drums 15 each pivotably supported by means of an arm 16 on the machine body 17. The arms 16 can be raised or lowered in relation to the machine body 17 and the pivotal axes of the arms extend parallel to the rotational axes of the drums 15 and more-or-less perpendicular to the mineral face 20. The machine 13 is mounted on a scraper-chain conveyor 14 for movement therealong back and forth alongside the mineral face 20. Machines of this type, and of similar constructions, are well known per se.

The drums 15 are each driven through gearing by drive means in the form of a three-phase a.c. motor 18 carried by the body 17. Electric power is supplied to the motors 18 by way of a cable 19. The machine 13 is propelled along the conveyor 14 by any suitable drive arrangement such as a winch, or a rack and pinion or chain drum, for example, (not shown) and a three-phase a.c. motor 21 is carried by the body 17 to effect the movement of the machine 13 along the conveyor 14 and the face 20. Electric power is supplied to the motor 21 by way of a cable 26 which is conveniently combined with the cable 19 within a protective sheath. It is also possible to connect the motors 18, 21 electrically to the power supply by way of intermediate bus-bars.

The cables 19, 26 lead back to a central control station 22 located remotely in the roadway 11. The propulsive speed of the machine 13 is controlled in dependence on the performance of the drums 15 so that the machine 13 is caused to move more quickly as the drums 15 are less loaded and vice versa. The control station 22 incorporates a control system with the necessary monitoring and control devices necessary to peform this operation.

As shown in FIG. 2, the control station 22, which preferably takes the form of a pressure resistant sealed housing, has a unit 23 which contains the motor contactors or switchgear together with monitoring means for sensing the power consumption of the drums 15. The unit 23 can also contain one or more transformers providing the main power supply for the motors 18, 21 as well as for the various electronic control devices. The monitoring means is connected to a control device 24, such as a microprocessor or similar computing circuit, which controls a frequency converter 25 the output of which connects to the cable 26. The frequency of the a.c. drive to the motor 21, which may be asynchronous, is thus controlled to vary the propulsive speed of the machine 13 in accordance with the performance of the cutting drums 15.

I claim:

1. In a mineral mining installation comprising a winning machine with a main body equipped with at least one rotary cutting means, first drive means carried on the body for driving the cutting means, and second drive means carried on the body for moving the machine; the improvement comprising: the second drive means is a three-phase a.c. motor and an electronic control system remote from the machine controls the second drive means to vary the speed thereof in dependence on the operation of the cutting means.

2. An installation according to claim 1, wherein the control system includes a frequency converter capable of varying the frequency of a.c. power supplied to said motor.

3. An installation according to claim 1, wherein the first drive means is at least one three-phase a.c. motor and the control system includes monitoring means for monitoring the power consumption of said motor.

4. An installation according to claim 3, wherein the control system further includes a frequency converter capable of varying the frequency of a.c. power supplied to said motor constituting the second drive means under control of the monitoring means.

5. An installation according to claim 3, wherein the first drive means is at least one three-phase asynchronous a.c. motor.

6. An installation according to claim 1, wherein the control system is incorporated in a control station in a gallery or roadway outside a main working where the winning machine operates and a cable extends between the machine and the control station and serves to supply power to said drive means.

7. An installation according to claim 6, wherein the cable is a composite cable.

8. An installation according to claim 1, wherein the machine is mounted for movement along a scraper chain conveyor.

9. An installation according to claim 1, wherein the second drive means is a three-phase asynchronous a.c. motor.

10. In a mineral winning installation which employs a self-propelled shearer driven by a three-phase a.c. motor-built onto the body structure of the machine and having at least one rotary cutter drum driven by a further three-phase a.c. motor also built onto the body structure of the machine; the improvement comprising a control station separate from the machine in a gallery or roadway outside the main working in which the shearer operates, a composite cable electrically connecting the motors to the control station, monitoring means in the control station for remotely sensing a function of the motor driving the cutter drum signifying the performance of the latter and control means in the control station for remotely controlling the operational speed of the motor driving the machine in accordance with the performance as sensed by the monitoring means.

11. An installation according to claim 10, wherein the monitoring means senses the power consumption of the motor driving the cutter drum and the speed of the motor driving the machine is controlled by varying the frequency of its applied power.

* * * * *